R. L. WHITESIDES.
ROLLER BEARING.
APPLICATION FILED AUG. 28, 1913.

1,116,186.

Patented Nov. 3, 1914.

WITNESSES.
J. R. Keller
John F. Will

INVENTOR.
Robert L. Whitesides

UNITED STATES PATENT OFFICE.

ROBERT L. WHITESIDES, OF PITTSBURGH, PENNSYLVANIA.

ROLLER-BEARING.

1,116,186.   Specification of Letters Patent.   Patented Nov. 3, 1914.

Application filed August 28, 1913. Serial No. 787,221.

*To all whom it may concern:*

Be it known that I, ROBERT L. WHITESIDES, a citizen of the United States, and resident of Pittsburgh, in the county of Allegheny and State of Pennsylvania, have invented a new and useful Improvement in Roller-Bearings; and I do hereby declare the following to be a full, clear, and exact description thereof.

My invention relates to improvements in roller bearings, and is particularly concerned with a device of this character which is of simple construction, economical to manufacture, and is adapted to be used in any relation in which a roll bearing is desired.

A further object is to provide a bearing which may be run without lubrication of any sort, and furthermore, provision is made whereby there may be a free circulation of air between the rollers so that the bearing is kept constantly cool.

Figure 1:
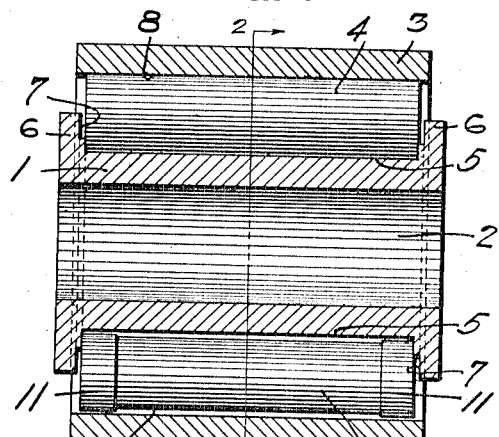
Figure 2:
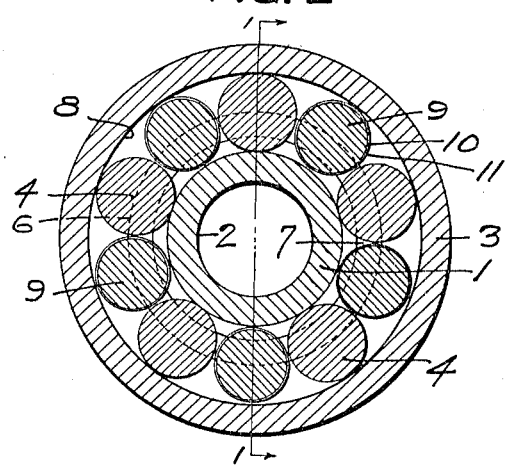
Figure 3:
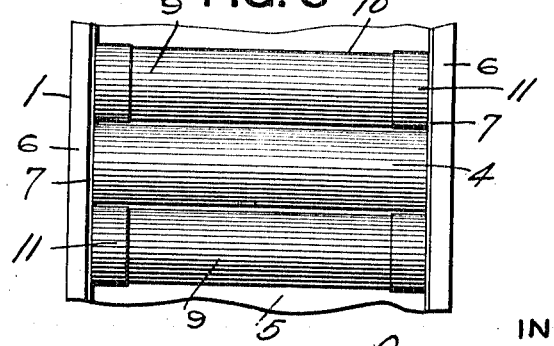

In the accompanying drawings, which illustrate a preferred embodiment of the invention, Figure 1 is a longitudinal section of the bearing; Fig. 2 is a transverse section on the line 2—2 Fig. 1; and Fig. 3 is a view in projection showing the relative arrangement of the bearing rolls.

In the embodiment of the invention herein selected for illustration 1 indicates a bearing sleeve shaft or spindle, as conditions may require, having the bore 2 by which it may be fitted upon the shaft, axle or other rotatable part.

3 is a casing or housing which surrounds the sleeve 1 and between which and said sleeve the bearing rollers are arranged. This sleeve or housing may be of any desired construction adapted for the particular use to which the bearing is to be put and obviously may be provided with end caps or the like for entirely inclosing the bearing.

The anti-friction element of the bearing comprises a series of bearing rolls 4 which consist simply of cylindrical sections or rolls as shown of uniform diameter throughout and of a diameter to completely fill the space between the sleeve 1 and the housing 3. In order to guide these rolls and hold them against longitudinal movement in the bearing the sleeve 1 is provided with a roller race or track 5 of a width substantially equal to the length of the bearing rolls, though sufficient play is provided so that there may be no wedging of the rolls within this track or race. The flanges of the sleeve forming this race may be extended as at 6 to form a proper closer for the roller race. The inner walls of these extensions of the flanges, however, are cut away as at 7 in order to reduce the end bearing engagement of the rolls with the sleeve. The housing 3 is simply of cylindrical form, the inner face 8 forming the bearing surface for the rolls.

In order to maintain the bearing rolls out of engagement with each other and properly separated, a series of separating rolls 9 are interposed respectively between the adjacent bearings rolls. These separating rolls are of peculiar construction. The ends of said rolls are of a diameter a little less than that of the bearing rolls so that when in operative position the separating rolls merely "float" between the bearing rolls and between the sleeve and the housing. In other words they do not sustain any portion of the bearing weight but act merely as separators and in operation are normally out of contact with the sleeve and housing. In order, moreover, to reduce the rolling friction between the separating rolls and the bearing rolls these separating rolls are milled out intermediate of their ends as indicated at 10, thereby leaving a very slight space between their intermediate portions and the bearing surfaces of the rolls. The heads 11 of the separating rolls left by the milling out are the only portions which contact with the bearing rolls, and in case the separating rolls at any time contact with the sleeve or the housing these heads are the only portions that do so contact. In addition to so reducing the rolling friction between the bearing rolls and the separating rolls as described the milled out portions of the separating rolls afford a passage for air between the rolls and therefore add to the cooling effect of the bearing. Though for clearness of illustration the milled out portion of the separating rolls appears to be quite considerable it is to be understood that this milled out portion is merely a few thousandths of an inch in depth so that the separating rolls so far as strength and wear are concerned are substantially cylindrical rolls.

It will be noted from the above description that all parts are rolling, there are no sliding contacts and no cage is used. The bearing may be made in one or more sections and may be used with or without end thrust ball races or dust guards as conditions may require.

While I have herein described a particular embodiment of my invention it is to be understood that the same may be altered in details or relative arrangement of parts within the scope of the appended claims.

What I claim is:

1. A roller bearing comprising an axial member or sleeve having an annular roll channel in the outer surface thereof, a housing having the cylindrical inner bearing face, a series of cylindrical bearing rolls of the same diameter from end to end, and a series of separating rolls interposed between said bearing rolls of the same length as but of slightly less diameter than said bearing rolls, said separating rolls having their surfaces intermediate their ends slightly cut away to reduce rolling friction and to provide for air circulation in the bearing.

2. A roller bearing comprising an inner bearing member having flanged ends forming a roll race, a housing having a cylindrical inner bearing surface, a series of cylindrical bearing rolls of the same diameter from end to end interposed between said inner member and housing and a series of separating rolls of substantially uniform diameter throughout but being very slightly reduced intermediate their ends interposed between said bearing rolls said separating rolls being of sufficiently less diameter than the bearing rolls to just keep them out of contact with said bearing members adjacent the extremities of said bearing rolls.

3. A roller bearing comprising an inner bearing sleeve having flanged ends, an annular shoulder at the base of each flange forming a roller race in the bearing face of said member between said flanges of a width equal to the length of the bearing rolls but less than the distance between the flanges, whereby end-friction on said bearing rolls and separating rolls is reduced to a minimum; a housing sleeve having a cylindrical inner bearing face, a series of bearing rolls interposed between said inner member and the housing adapted to run in said race, and a series of separating rolls of slightly less diameter than the bearing rolls, each separating roll being of the same length as the bearing rolls and having its central portion slightly cut away to reduce rolling friction and permit air circulation in the bearing.

In testimony whereof, I the said ROBERT L. WHITESIDES have hereunto set my hand.

ROBERT L. WHITESIDES.

Witnesses:
J. R. KELLER,
JOHN F. WILL.